US009894558B2

(12) United States Patent
Koskinen et al.

(10) Patent No.: US 9,894,558 B2
(45) Date of Patent: Feb. 13, 2018

(54) LOWER AND UPPER BOUNDS FOR FLOW-CONTROL DATA REQUESTS BETWEEN NETWORK NODES

(71) Applicant: Nokia Solutions and Networks Oy, Espoo (FI)

(72) Inventors: Henri Markus Koskinen, Espoo (FI); Tsunehiko Chiba, Saitama (JP)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/513,425

(22) PCT Filed: Jul. 14, 2015

(86) PCT No.: PCT/EP2015/066027
§ 371 (c)(1),
(2) Date: Mar. 22, 2017

(87) PCT Pub. No.: WO2016/045810
PCT Pub. Date: Mar. 31, 2016

(65) Prior Publication Data
US 2017/0311200 A1    Oct. 26, 2017

Related U.S. Application Data

(60) Provisional application No. 62/055,790, filed on Sep. 26, 2014.

(51) Int. Cl.
*H04W 28/02* (2009.01)
*H04W 72/04* (2009.01)
(Continued)

(52) U.S. Cl.
CPC ....... *H04W 28/0278* (2013.01); *H04W 16/32* (2013.01); *H04W 72/042* (2013.01);
(Continued)

(58) Field of Classification Search
CPC ......... H04W 72/0413; H04W 28/0278; H04W 76/025; H04W 28/08; H04W 52/245; H04W 52/365; H04W 36/023
See application file for complete search history.

(56) References Cited

U.S. PATENT DOCUMENTS

| 7,603,475 B2 | 10/2009 | Yang et al. |
| 2007/0286070 A1 | 12/2007 | Schliwa-Bertling et al. |

(Continued)

OTHER PUBLICATIONS

"New Work Item Description: Dual Connectivity for LTE", 3GPP TSG-RAN meeting #62, RP-132069, Agenda: 13.1.2, NTT Docomo, Inc., Dec. 3-6, 2013, 7 Pages.
(Continued)

*Primary Examiner* — Kwasi Karikari
(74) *Attorney, Agent, or Firm* — Nokia Technologies Oy (57) ABSTRACT

Lower and upper bounds for flow-control data requests between network nodes Methods and devices are shown for a wireless communication network where a user equipment consumes radio resources provided by at least two different network nodes, at least one node being a master node and at least another node being a secondary node. The secondary node determines a desired amount of data to be targeted to the user equipment and then transmits an indication of the desired amount of data to the master node. A master node receives an indication of the desired amount of data targeted to the user equipment and then controls the amount of data transmitted to the user equipment via the secondary node based on that indication.

16 Claims, 4 Drawing Sheets

U-Plane connectivity of eNBs involved in dual connectivity (51) Int. Cl.
 H04W 76/02 (2009.01)
 H04W 16/32 (2009.01)
 H04W 76/04 (2009.01)
 H04W 88/02 (2009.01)
(52) U.S. Cl.
 CPC ....... *H04W 76/025* (2013.01); *H04W 76/046* (2013.01); *H04W 88/02* (2013.01)

(56) References Cited

U.S. PATENT DOCUMENTS

2015/0085800 A1\* 3/2015 Sivanesan ............ H04W 24/04 370/329
2015/0215827 A1\* 7/2015 Zhang ............... H04W 28/0247 370/331

OTHER PUBLICATIONS

"E-UTRAN X2 Interface User Plane Protocol", 3GPP TSG-RAN Working Group 3 meeting #85, R3-142037, Agenda: 20.1.5, Ericsson, Aug. 18-22, 2014, 27 Pages.
"Report of 3GPP TSG RAN WG3 Meeting #84", 3GPP TSG-RAN Working Group 3 meeting #85, R3-141531, Agenda: 3, MCC, Aug. 18-22, 2014, 136 Pages.
"Dual Connectivity Discussion Status in RAN3#85 and Way Forward", 3GPP TSG-RAN Working Group 3 meeting #85, R3-142109, Agenda: 20, NEC (Rapporteur), Aug. 18-22, 2014, 10 Pages.
"3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP TS 23.401, V13.0.0, Sep. 2014, pp. 1-308.
"Introduction of Dual Connectivity", 3GPP TSG-RAN Working Group 2 meeting #87bis, R2-14xxxx, NTT Docomo Inc., Oct. 6-10, 2014, 65 Pages.
International Search Report and Written Opinion received for corresponding Patent Cooperation Treaty Application No. PCT/EP2015/066027 dated Sep. 24, 2015, 13 pages.
Ericsson: "Flow control for split bearer option", 3GPP Draft; R3-140819, 3rd Generation Partnership Project (3GPP), vol. RAN WG3, No. San Jose del Cabo, Mexico; Mar. 31, 2014-Apr. 4, 2014, Mar. 30, 2014, XP050795509.
Ericsson: "PDCP reordering in dual connectivity", 3GPP Draft; R2-141760—PDCP Reordering in Dual Connectivity, 3rd Generation Partnership Project (3GPP), vol. RAN WG2, No. Valencia, Spain; Mar. 31, 2014-Apr. 4, 2014, Mar. 31, 2014, XP050817987.
Ericsson: "PDCP feedback and flow control", 3GPP Draft, R3-141325, 3rd Generation Partnership Project (3GPP), vol. RAN WG3, No. Seoul, South Korea; May 19, 2014-May 23, 2014 May 18, 2014, XP050790876.
CATT: "Flow control mechanism for 3C", 3GPP Draft; R3-140641, 3rd Generation Partnership Project (3GPP), vol. RAN WG3 No. San Jose Del Cabo Mexico, Mar. 31, 2014-Apr. 4, 2014 Mar. 30, 2014, XP050795333.
Nokia Networks et al: "Flow Control buffer size definition", 3GPP Draft; R3-142738 Flow Control Buffer Size Definition, 3rd Generation Partnership Project (3GPP), vol. RAN WG3, No. San Francisco, USA, Nov. 17, 2014-Nov. 21, 2014 Nov. 17, 2014, XP050877875.

\* cited by examiner

U-Plane connectivity of eNBs involved in dual connectivity

FIG. 2

C-Plane connectivity of eNBs involved in dual connectivity

LOWER AND UPPER BOUNDS FOR FLOW-CONTROL DATA REQUESTS BETWEEN NETWORK NODES

RELATED APPLICATION

This application was originally filed as Patent Cooperation Treaty Application No. PCT/EP2015/066027 filed Jul. 14, 2015 which claims priority benefit to U.S. Provisional Patent Application No. 62/055,790, filed Sep. 26, 2014.

TECHNICAL FIELD

This invention relates generally to communication networks such as LTE that enable a framework of dual connectivity with SeNB and MeNB, including components such as eNBs, which can include macro eNBs as well as micro/pico eNBs.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Acronyms used in the drawings and this disclosure are defined at the end of this disclosure.

Regarding small cells enhancements, two points of interest are dual connectivity and bearer split. Dual connectivity is introduced because of the non-ideal backhaul of a small cell, where Pcell and Scell operation separated by such a backhaul could previously not be supported, which introduces the concepts of Master eNB (MeNB) and Secondary eNB (SeNB).

Dual connectivity concerns an operation where a given UE consumes radio resources provided by at least two different network points (Master and Secondary eNBs) connected with non-ideal backhaul while in RRC_CONNECTED. A bearer split in dual connectivity refers to the ability to split a bearer over multiple eNBs.

A master cell group (MCG) is the group of the serving cells associated with the MeNB. A Master eNB, in dual connectivity, is the eNB which terminates at least S1-MME and therefore acts as mobility anchor towards the CN. A secondary cell group (SCG) is the group of the serving cells associated with the SeNB. A Secondary eNB (SeNB) in dual connectivity is an eNB providing additional radio resources for the UE, which is not the Master eNB. And Xn is interface between MeNB and SeNB. If the current E-UTRAN architecture was selected as baseline, Xn would mean X2.

3GPP RAN2 and RAN3 have been working on Dual Connectivity work item (RP-132069). In general terms there are three types of bearers of dual connectivity known in the art. For MCG bearers, the MeNB is U-plane connected to the S-GW via S1-U, where the SeNB is not involved in the transport of user plane data. For split bearers, the MeNB is U-plane connected to the S-GW via S1-U and in addition, the MeNB and the SeNB are interconnected via X2-U. For SCG bearers, the SeNB is directly connected with the S-GW via S1-U.

Particularly for split bearers, one open issue being discussed in RAN3 is how flow-control data requests are defined, particularly signaling indications by which SeNB indicates to MeNB how much more downlink data for a given UE MeNB should send via SeNB.

The draft stage-3 TS capturing the agreed indications is in R3-142037 discussing successful operation of Downlink Data Delivery Status. The purpose of the Downlink Data Delivery Status procedure is to provide feedback from the SeNB to the MeNB to allow the MeNB to control the downlink user data flow via the SeNB for the UE and its individual split E-RABs. The SeNB may also transfer uplink user data for the concerned E-RAB to the MeNB together with a DL data delivery status frame within the same GTP-U PDU. When the SeNB decides to trigger the Feedback for Downlink Data Delivery procedure it shall report the following:

(a) the highest PDCP PDU sequence number successfully delivered in sequence to the UE among those PDCP PDUs received from the MeNB;

(b) the available buffer size in bytes for the concerned E-RAB, counted from the PDCP PDU sequence number reported under (a) above; and (c) the available buffer size in bytes for the UE, counted from the PDCP PDU sequence number reported, as described under (a) above, for the concerned E-RAB and most recently reported for all other E-RABs established for the UE.

DETAILED DESCRIPTION OF THE DRAWINGS

What we propose herein is a novel method that achieves an efficient flow control mechanism in dual connectivity. However, before proceeding with additional description of problems and solutions herein to those problems, reference is made to FIG. 1, which shows a block diagram of an exemplary system in which the exemplary embodiments may be practiced.

Figure 1:
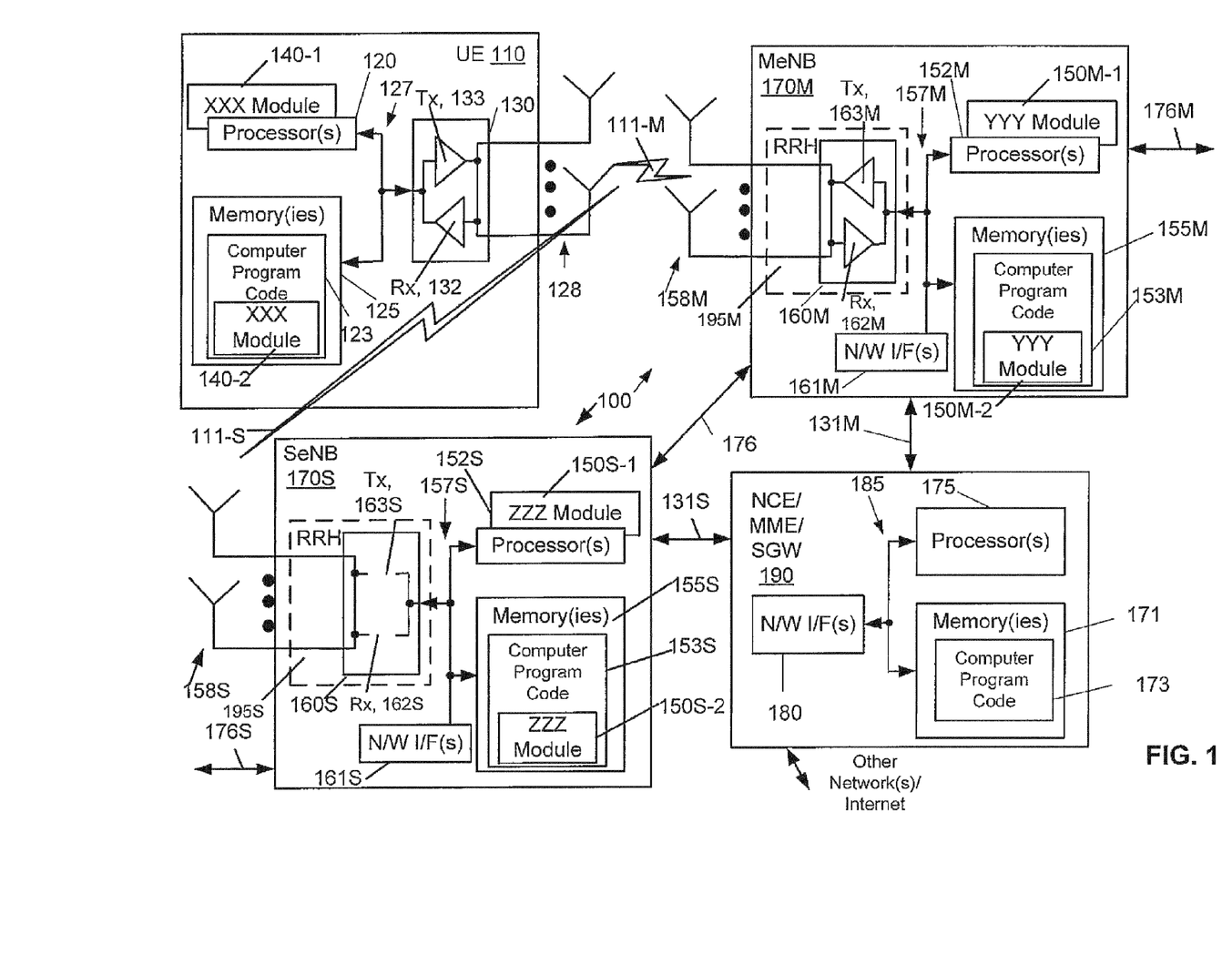
FIG. 1 is a block diagram of an exemplary system in which the exemplary embodiments may be practiced.

FIG. 1 shows a block diagram of an exemplary system in which the exemplary embodiments may be practiced. The MeNB 170M is a master base station that provides access by wireless devices such as the UE 110 to the wireless network 100. The MeNB 170M includes one or more processors 152M, one or more memories 155M, one or more network interfaces (N/W I/F(s)) 161M, and one or more transceivers 160M interconnected through one or more buses 157M. Each of the one or more transceivers 160M includes a receiver, Rx, 162M and a transmitter, Tx, 163M. The one or more transceivers 160M are connected to one or more antennas 158M. The one or more memories 155M include computer program code 153M. The MeNB 170M includes a YYY module 150M, comprising one of or both parts 150M-1 and/or 150M-2, which may be implemented in a number of ways. The methods discussed herein are assumed to be performed by the respective modules.

The YYY module 150M may be implemented in hardware as YYY module 150M-1, such as being implemented as part of the one or more processors 152M. The YYY module 150M-1 may be implemented also as an integrated circuit or through other hardware such as a programmable gate array. In another example, the YYY module 150M may be implemented as YYY module 150M-2, which is implemented as computer program code 153M and is executed by the one or more processors 152M. For instance, the one or more memories 155M and the computer program code 153M are configured to, with the one or more processors 152M, cause the MeNB 170M to perform one or more of the operations as described herein. The one or more network interfaces 161M communicate over a network such as via the links 176M and 131M. Two or more MeNBs 170M communicate using, e.g., link 176M. The link 176M may be wired or wireless or both and may implement, e.g., an X2 interface.

The one or more buses 157M may be address, data, or control buses, and may include any interconnection mechanism, such as a series of lines on a motherboard or integrated circuit, fiber optics or other optical communication equipment, wireless channels, and the like. For example, the one or more transceivers 160M may be implemented as a remote radio head (RRH) 195M, with the other elements of the eNB 170M being physically in a different location from the RRH, and the one or more buses 157M could be implemented in part as fiber optic cable to connect the other elements of the MeNB 170M to the RRH 195M.

The SeNB 170S is a secondary base station that provides access by wireless devices such as the UE 110 to the wireless network 100. The SeNB 170S includes one or more processors 152S, one or more memories 155S, one or more network interfaces (N/W I/F(s)) 161S, and one or more transceivers 160S interconnected through one or more buses 157S. Each of the one or more transceivers 160S includes a receiver, Rx, 162S and a transmitter, Tx, 163S. The one or more transceivers 160S are connected to one or more antennas 158S. The one or more memories 155S include computer program code 153S. The SeNB 170S includes a ZZZ module 150S, comprising one of or both parts 150S-1 and/or 150S-2, which may be implemented in a number of ways.

The ZZZ module 150S may be implemented in hardware as ZZZ module 150S-1, such as being implemented as part of the one or more processors 152S. The ZZZ module 150S-1 may be implemented also as an integrated circuit or through other hardware such as a programmable gate array. In another example, the ZZZ module 150S may be implemented as ZZZ module 150S-2, which is implemented as computer program code 153S and is executed by the one or more processors 152S. For instance, the one or more memories 155S and the computer program code 153S are configured to, with the one or more processors 152S, cause the SeNB 170S to perform one or more of the operations as described herein. The one or more network interfaces 161S communicate over a network such as via the links 176S and 131S. The eNBs, MeNB 170M and SeNB 170S communicate using, e.g., link 176. The link 176 may be wired or wireless or both and may implement, e.g., an X2 interface. Two or more SeNBs 170S communicate using, e.g., link 176S. The link 176S may be wired or wireless or both and may implement, e.g., an X2 interface.

The one or more buses 157S may be address, data, or control buses, and may include any interconnection mechanism, such as a series of lines on a motherboard or integrated circuit, fiber optics or other optical communication equipment, wireless channels, and the like. For example, the one or more transceivers 160S may be implemented as a remote radio head (RRH) 195S, with the other elements of the eNB 170S being physically in a different location from the RRH, and the one or more buses 157S could be implemented in part as fiber optic cable to connect the other elements of the SeNB 170S to the RRH 195S.

Turning to user equipment in FIG. 1, a UE 110 is in wireless communication with a wireless network 100. The user equipment 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123.

The UE 110 includes a XXX module 140, comprising one of or both parts 140-1 and/or 140-2, which may be implemented in a number of ways. The XXX module 140 may be implemented in hardware as XXX module 140-1, such as being implemented as part of the one or more processors 120. The XXX module 140-1 may be implemented also as an integrated circuit or through other hardware such as a programmable gate array. In another example, the XXX module 140 may be implemented as XXX module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with MeNB 170M via a wireless link 111M. The UE 110 communicates with SeNB 170S via a wireless link 111S.

The wireless network 100 may include a network control element (NCE) 190 that may include MME/SGW functionality, and which provides connectivity with a further network, such as a telephone network and/or a data communications network (e.g., the Internet). The MeNB 170M and SeNB 170S are coupled via links 131M and 131S, respectively to the NCE 190. The links 131M and 131S may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented using hardware such as processors 152M, 152S or 175 and memories 155M, 115S, and 171.

The computer readable memories 125, 155M, 155S, and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 152M, 152S, and 175 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 110 can include, but are not limited to, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. For example, in an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155M, 155S, 171 or other device) that may be any media or means that can contain or store the instructions for use by or in connection with an instruction execution system, apparatus, or device, such as a computer.

Figure 2:
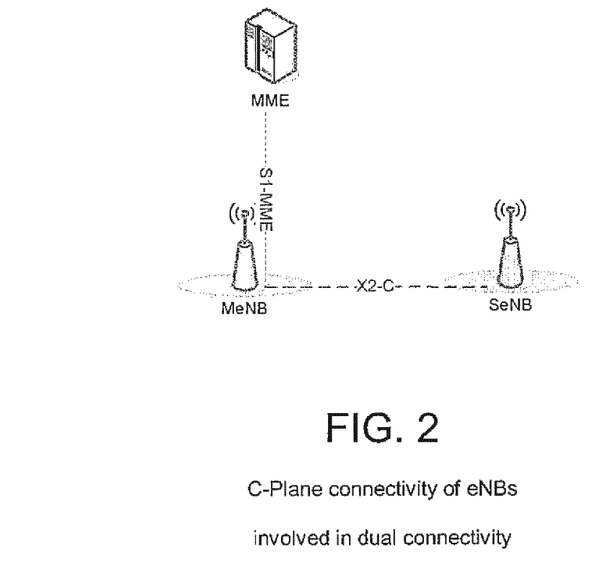
FIG. 2 illustrates the C-plane architecture for dual connectivity.
Figure 3:
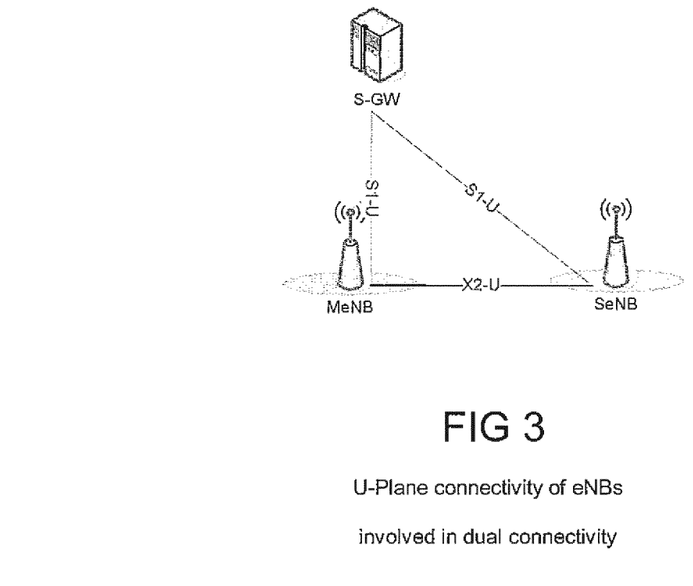
FIG. 3 illustrates the U-plane architecture for dual connectivity.

Dual connectivity is the mode of operation of a UE in RRC_CONNECTED, configured with a Master Cell Group (MCG) and a Secondary Cell Group (SCG). FIG. 2 and FIG. 3 show the C-plane and U-plane architecture for dual connectivity, respectively.

While the current 3GPP (please see e.g. TS23.401 of 3GPP) already has some minimum and maximum limits, for example for GBR (guaranteed bit rate) bearers in QoS parameters, currently it appears that there are no considerations to indicate both lower and upper bounds in units of bits for the purpose of dynamic flow control.

As discussed earlier herein, when the SeNB decides to trigger the Feedback for Downlink Data Delivery procedure it shall report the following:

(a) the highest PDCP PDU sequence number successfully delivered in sequence to the UE among those PDCP PDUs received from the MeNB (b) the available buffer size in bytes for the concerned E-RAB, counted from the PDCP PDU sequence number reported under (a) above (c) the available buffer size in bytes for the UE, counted from the PDCP PDU sequence number reported, as described under (a) above, for the concerned E-RAB and most recently reported for all other E-RABs established for the UE.

A problem that exists in the current art that has not been solved concerns the fact that item (c) above amounts to item (b) summed over all the split E-RABs for the UE. It also appears that reporting item (c) is redundant, as MeNB can simply deduce it by adding up the indications (b) received for all the split E-RABs.

On the other hand, both items (b) and (c) currently speak of "available buffer size", suggesting an upper bound. This seems to overlook one of the goals in the flow control between SeNB and MeNB, namely ensuring that the transmission buffers at SeNB do not run empty, which could result in underutilization of the SeNB's radio resources.

Thus, we propose a novel method that achieves an efficient flow control mechanism in dual connectivity.

A flow control between SeNB and MeNB for split bearers has at least the following two goals:

(1) ensuring that the transmission buffers for a given UE with split bearer(s) do not run empty at SeNB, which could result in underutilization of the SeNB's radio resources; and (2) ensuring that the transmission-buffering time for a given split E-RAB does not grow too long, which could result in exceeding the Packet-delay budget, one of the QoS parameters defined for the E-RAB.

With the above in mind, this invention proposes that SeNB report to MeNB both of the following:

(A) An indication of minimum amount of data targeted to a given UE (regardless of the specific E-RAB) that MeNB should send to SeNB. This is to serve purpose (1) above. In relation to the indications currently captured as quoted in the Background section, above, this is equivalent to item (c) but to be interpreted by MeNB as a lower bound instead of an upper bound.

(B) Per E-RAB indications of maximum amount of data that MeNB should send to SeNB. This is to serve purpose (2) above. In relation to the indications currently captured as quoted in the Background section, above, this is equivalent to item (b).

In the general case, the sum over all split E-RABs of a given UE, of the indications of type (B) above, is greater than the indication of type (A) above.

Thus, this method prevents underflow and overflow of buffers at the same time, improving the flow control for an eNB. Another advantage is more complete flow-control information to the MeNB.

In an embodiment, the split bearer option of dual connectivity requires flow control on the X2-U interface between MeNB and SeNB. This embodiment concerns the flow control protocol, where it indicates both a minimum amount of data per UE (regardless of E-RAB) and a maximum amount of data per E-RAB of UE. These amounts are then used for dual-connectivity flow control and scheduling purposes.

Such a method is novel over the current state of the art at least in the fact that it would provide together the lower bound per UE and the upper bound per E-RAB for buffer size to implement flow control. Controlling the data flow between two apparatuses by this method is also novel and inventive in the use of per-UE parameterization.

Moreover, since the proposed indications apply in signaling between SeNB and MeNB for the purpose of flow control instead of QoS parameters that are static properties of either bearers or UE subscription, all bounds proposed would not be bearer-specific (lower bound per UE), and the bounds proposed would be more dynamic in nature, which is reflected by their definition in units of bits instead of in units of bits per second.

Figure 4A:
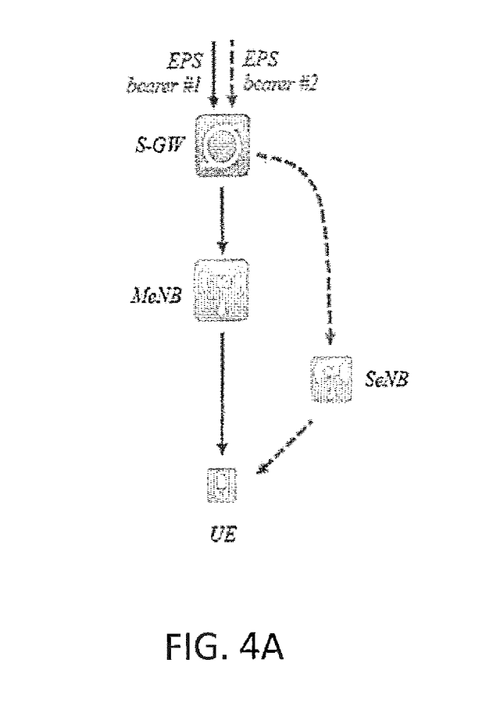
FIG. 4A and FIG. 4B illustrate three types of bearers of dual connectivity.
Figure 4B:
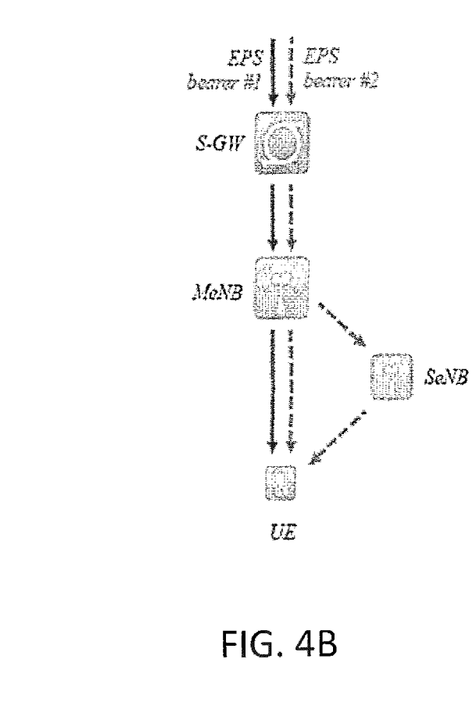

Three types of bearers of dual connectivity are shown in FIG. 4A, and FIG. 4B in relation to UE 410. For MCG bearers, the MeNB 430 is U-plane connected to the S-GW 440 via S1-U, where the SeNB 420 is not involved in the transport of user plane data. For split bearers, the MeNB 430 is U-plane connected to the S-GW 440 via S1-U and in addition, the MeNB 430 and the SeNB 420 are interconnected via X2-U. For SCG bearers, the SeNB 420 is directly connected with the S-GW 440 via S1-U. Of the three types of bearers supported: the "EPS bearer #1" in both of the figures is an MCG bearer; the "EPS bearer #2" in FIG. 4A is an SCG bearer; and the "EPS bearer #2" in FIG. 4B is a split bearer.

Figure 5:
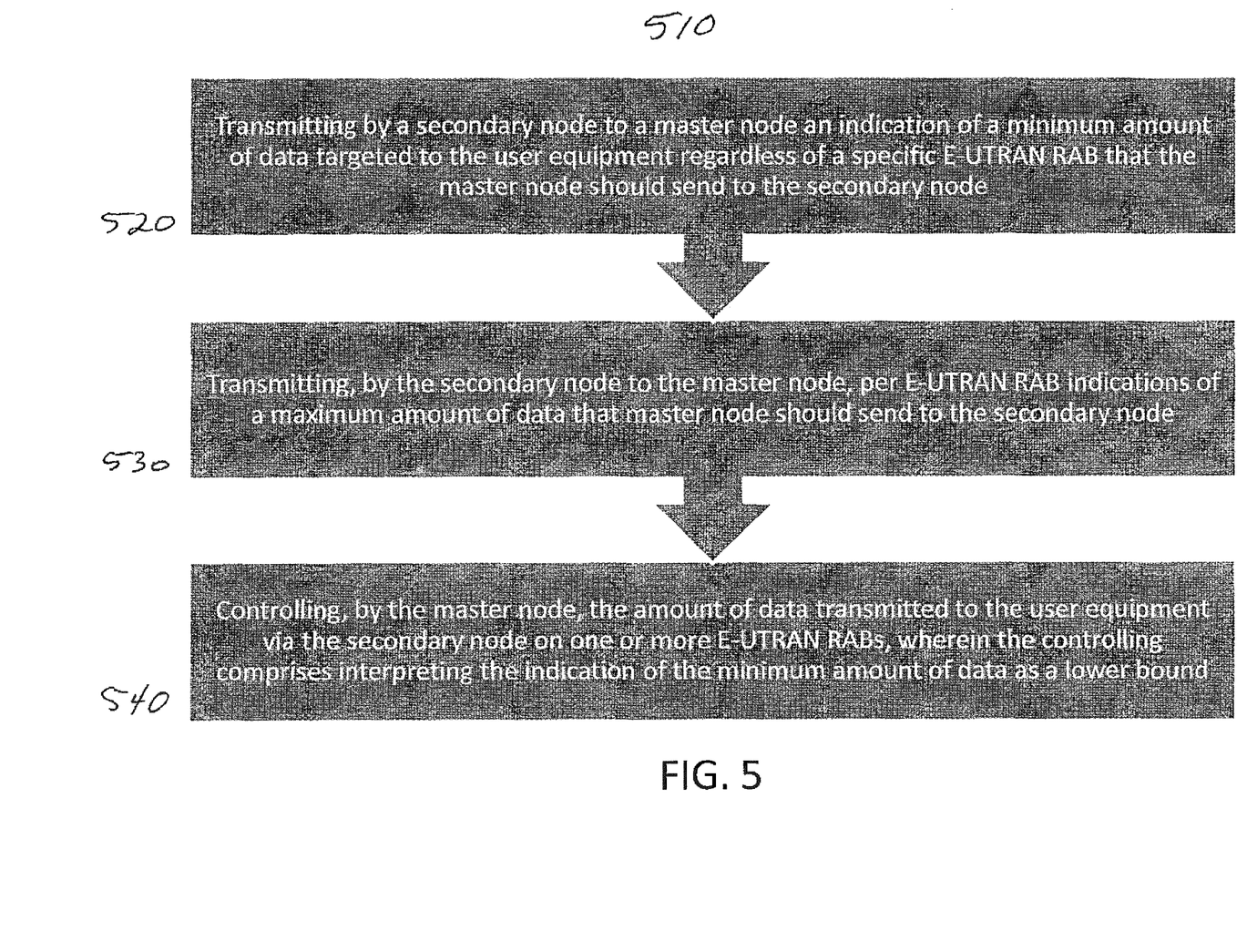
FIG. 5 is a logic flow diagrams illustrating the operation of an exemplary method, a result of execution of computer program instructions embodied on a computer readable memory, and/or functions performed by logic implemented in hardware, in accordance with exemplary embodiments.

Referring now to FIG. 5, this figure illustrates a flow chart of an exemplary method for the reporting scenario discussed herein. This method is performed by actions first by the SeNB, and then the MeNB. and may be performed by software executed by hardware, by hardware (such as an integrated circuit) configured to perform the illustrated operations, or by a combination of these.

Further, FIG. 5 illustrates the operation of an exemplary method, a result of execution of computer program instructions embodied on a computer readable memory, and/or functions performed by logic implemented in hardware, in accordance with exemplary embodiments herein. The blocks in FIG. 5 may also be considered to be interconnected means for performing the functions in the blocks. The blocks in FIG. 5 are assumed to be performed by the respective modules described earlier herein, for example for the MeNB the YYY module and for the SeNB the ZZZ module.

In an exemplary embodiment (item 1), a method comprises, in a communication network where a user equipment consumes radio resources provided by at least two different network nodes, where at least one node is a master node and at least one node is a secondary node, transmitting by the secondary node to the master node an indication of a minimum amount of data targeted to the user equipment regardless of a specific E-UTRAN Radio Access Bearer that the master node should send to the secondary node; transmitting, by the secondary node to the master node, per E-UTRAN Radio Access Bearer indications of a maximum amount of data that master node should send to the secondary node; controlling, by the master node, the amount of data transmitted to the user equipment via the secondary node on one or more E-UTRAN Radio Access Bearers, wherein the controlling comprises interpreting the indication of the minimum amount of data as a lower bound.

In another embodiment of the method in item 1, a method (item 2) is performed wherein the downlink radio transmission of the E-UTRAN Radio Access Bearers to the user equipment is done by both the master node and the secondary node.

In another embodiment of the method in item 1, a method (item 3) is performed wherein the E-UTRAN Radio Access Bearers are split bearers of the user equipment.

Turning to FIG. 5, in a communication network where a user equipment consumes radio resources provided by at least two different network nodes, where at least one node is a master node and at least one node is a secondary node, the process 510 comprises blocks 520, 530, and 540. Block 520 represents the secondary node transmitting to the master node an indication of a minimum amount of data targeted to the user equipment regardless of a specific E-UTRAN RAB that the master node should send to the secondary node. Block 530 represents the secondary node transmitting to the master node, per E-UTRAN RAB, indications of a maximum amount of data that master node should send to the secondary node. Block 540 represents the master node controlling the amount of data transmitted to the user equipment via the secondary node on one or more E-UTRAN RABs, wherein the controlling comprises interpreting the indication of the minimum amount of data as a lower bound. Other information from the UE, the SGW and other nodes and elements, not shown, may also be input while other information to the UE, the SGW, and other nodes and elements, not shown, may also be output.

If desired, the different functions discussed herein may be performed in a different order and/or concurrently with each other. Furthermore, if desired, one or more of the above-described functions may be optional or may be combined.

With this method, the technical effect would be achieving an efficient flow control mechanism in dual connectivity. Other technical effects of this method would be preventing underflow and overflow of buffers at the same time, improving the flow control for an eNB, and achieving more complete flow-control information for the MeNB.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

Appendix A has additional subject matter related to the instant embodiments. A draft (with edits) of 36.300 CRxxxx (REL-12) R2-14xxxx Introduction of Dual Connectivity proposed for 3GPP TSG-RAN WG2 Meeting #87bis, R2-14xxxx, Shanghai, China, 6-10 Oct. 2014 is submitted herewith as Appendix A, which forms part of the instant application and is hereby incorporated by reference in its entirety.

The following abbreviations that may be found in the specification and/or the drawing figures are defined as follows:

1×CSFB Circuit Switched Fallback to 1×RTT
3GPP third generation partnership project
ABS Almost Blank Subframe
ACK Acknowledgement
ACLR Adjacent Channel Leakage Ratio
AM Acknowledged Mode
AMBR Aggregate Maximum Bit Rate
ANDSF Access Network Discovery and Selection Function
ANR Automatic Neighbour Relation
ARQ Automatic Repeat Request
ARP Allocation and Retention Priority
AS Access Stratum
BCCH Broadcast Control Channel
BCH Broadcast Channel
BSR Buffer Status Report
C/I Carrier-to-Interference Power Ratio
CAZAC Constant Amplitude Zero Auto-Correlation
CA Carrier Aggregation
CBC Cell Broadcast Center
CC Component Carrier
CG Cell Group
CIF Carrier Indicator Field
CMAS Commercial Mobile Alert Service CMC Connection Mobility Control
CP Cyclic Prefix
CoMP Coordinated Multi Point
CN Core Network
C-plane Control Plane
CQI channel quality indicator
CRC Cyclic Redundancy Check
CRE Cell Range Extension
CRS Cell-specific Reference Signal
CSA Common Subframe Allocation
CSG Closed Subscriber Group
CSI channel state information
CSI-IM CSI interference measurement
CSI-RS CSI reference signal
DC Dual Connectivity
DCCH Dedicated Control Channel
DeNB Donor eNB
DFTS DFT Spread OFDM
DL downlink
DRB Data Radio Bearer
DRMS demodulation reference signal
eNB or eNodeB base station, evolved Node B
DRX Discontinuous Reception
DTCH Dedicated Traffic Channel
DTX Discontinuous Transmission
DwPTS Downlink Pilot Time Slot
EAB Extended Access Barring
ECGI E-UTRAN Cell Global Identifier
ECM EPS Connection Management
EMM EPS Mobility Management
E-CID Enhanced Cell-ID (positioning method)
eIMTA Enhanced Interference Management and Traffic Adaptation
eHRPD enhanced High Rate Packet Data
eNB E-UTRAN NodeB
EPC Evolved Packet Core
EPDCCH enhanced physical downlink control channel
EPS Evolved Packet System
E-RAB E-UTRAN Radio Access Bearer
E-UTRA Evolved UTRA
E-UTRAN Evolved UTRAN
FDD Frequency Division Duplex
FDM Frequency Division Multiplexing
GERAN GSM EDGE Radio Access Network
GSM Global System for Mobile communication
GBR Guaranteed Bit Rate
GP Guard Period
GW gateway
GWCN GateWay Core Network
HARQ Hybrid ARQ
(H)eNB eNB or HeNB
HO Handover
HRPD High Rate Packet Data
HSDPA High Speed Downlink Packet Access
ICIC Inter-Cell Interference Coordination
IDC In-Device Coexistence
IP Internet Protocol
ISM Industrial, Scientific and Medical
KPAS Korean Public Alert System
LB Load Balancing
LCG Logical Channel Group
LCR Low Chip Rate
LCS LoCation Service
LIPA Local IP Access
LHN Local Home Network
LHN ID Local Home Network ID
LMU Location Measurement Unit
LPPa LTE Positioning Protocol Annex
L-GW Local Gateway
LTE long term evolution
LTE-A long term evolution-advanced
MAC Medium Access Control
MCG Master Cell Group
MeNB Master eNB
MIMO multiple in, multiple out
MME mobility management entity
NCE network control entity
NZP non-zero power
PBR Prioritised Bit Rate
PCC Primary Component Carrier
PCell Primary Cell
PDSCH physical downlink shared channel
PMI precoding matrix indicator
PSCell Primary SCell
Rel release
RE resource element
RI Rank Indicator
RS reference signal
RRC radio resource control
SCG Secondary Cell Group
SeGW Security Gateway
SeNB Secondary eNB
SGW serving gateway
SNR signal-to-noise ratio
TS technical specification
Tx or tx transmission or transmitter
UE user equipment
ULA uniform linear array
X2 GW X2 GateWay
X2-C X2-Control plane
X2-U X2-User plane
ZP zero power

We claim:

1. A method comprising:
in a wireless communication network where a user equipment consumes radio resources provided by at least two different network nodes, where at least one node is a master node and at least another node is a secondary node, determining, by the secondary node, a desired amount of data targeted to the user equipment; and
transmitting, by the secondary node to the master node, an indication of the desired amount of data, wherein one of:
the desired amount of data comprises a minimum amount of data targeted to the user equipment regardless of a specific bearer; and
the desired amount of data comprises a maximum amount of data targeted to the user equipment on a specific bearer, wherein the indication comprises one or more bearer-specific indications.

2. The method according to claim 1, wherein both the master node and the secondary node perform a downlink radio transmission to the user equipment.

3. The method according to claim 2, wherein the downlink radio transmission is via one or more bearers to the user equipment.

4. The method according to claim 3, wherein the one or more bearers comprise split bearers of the user equipment.

5. A method comprising:
receiving, by a master node in a wireless communication network, where a user equipment consumes radio resources provided by at least two different network nodes, where at least one node is the master node and at least another node is a secondary node, from the secondary node, an indication of a desired amount of data targeted to the user equipment; and controlling, by the master node, the amount of data transmitted to the user equipment via the secondary node based on the indication; and one of:

wherein the indication indicates a minimum amount of data targeted to the user equipment regardless of a specific bearer for the master node to send to the secondary node, the controlling controls data on one or more bearers, and the controlling comprises interpreting the indication of the minimum amount of data as a lower bound; and wherein the indication comprises one or more bearer-specific indications, the indications indicate a maximum amount of data for the master node to send to the secondary node on a specific bearer, the controlling controls data on a specific bearer, and the controlling comprises interpreting the indication of the maximum amount of data as an upper bound.

6. The method according to claim 5, wherein both the master node and the secondary node perform a downlink radio transmission to the user equipment.

7. The method according to claim 6, wherein the downlink radio transmission is via one or more bearers to the user equipment.

8. The method of according to claim 7, wherein the one or more bearers comprise split bearers of the user equipment.

9. An apparatus comprising:

at least one processor and at least one memory including computer program code, wherein the at least one memory and the computer code are configured, with the at least one processor, to cause the apparatus to at least perform the following:

determining a desired amount of data targeted to a user equipment in a wireless communication network with the apparatus, where the user equipment consumes radio resources provided by at least the apparatus and a master node in the wireless communication network and transmitting, to the master node, an indication of the desired amount of data, wherein one of:

the desired amount of data comprises a minimum amount of data targeted to the user equipment regardless of a specific bearer; and the desired amount of data comprises a maximum amount of data targeted to the user equipment on a specific bearer, and wherein the indication comprises one or more bearer-specific indications.

10. The apparatus according to claim 9, wherein both the master node and the apparatus perform a downlink radio transmission to the user equipment.

11. The apparatus according to claim 10, wherein the downlink radio transmission is via one or more bearers to the user equipment.

12. The apparatus according to claim 11, wherein the one or more bearers comprise split bearers of the user equipment.

13. An apparatus comprising:

at least one processor and at least one memory including computer program code, wherein the at least one memory and the computer code are configured, with the at least one processor, to cause the apparatus to at least perform the following:

receiving an indication of a desired amount of data targeted to a user equipment in a wireless communication network with the apparatus, where a user equipment consumes radio resources provided by at least the apparatus and a secondary node in the wireless communication network; and controlling the amount of data transmitted to the user equipment via the secondary node based on the indication; and one of:

wherein the indication indicates a minimum amount of data targeted to the user equipment regardless of a specific bearer for the master node to send to the secondary node, the controlling controls data on one or more bearers, and the controlling comprises interpreting the indication of the minimum amount of data as a lower bound; and wherein the indication comprises one or more bearer-specific indications, the indications indicate a maximum amount of data for the master node to send to the secondary node on a specific bearer, the controlling controls data on a specific bearer, and the controlling comprises interpreting the indication of the maximum amount of data as an upper bound.

14. The apparatus according to claim 13, wherein both the apparatus and the secondary node perform a downlink radio transmission to the user equipment.

15. The apparatus according to claim 14, wherein the downlink radio transmission is via one or more bearers to the user equipment.

16. The apparatus according to claim 15, wherein the one or more bearers comprise split bearers of the user equipment.

* * * * *